US011945258B1

(12) United States Patent
Williams et al.

(10) Patent No.: US 11,945,258 B1
(45) Date of Patent: Apr. 2, 2024

(54) MULTI-SIZED PAINT ROLLER CLEANING DEVICE

(71) Applicant: Port86, LLC, Helena, MT (US)

(72) Inventors: Patrick A Williams, Helena, MT (US); Kimm L. Reid, Regina (CA)

(73) Assignee: Port86, LLC, Helena, MT (US)

( * ) Notice: Subject to any disclaimer, the term of this patent is extended or adjusted under 35 U.S.C. 154(b) by 0 days.

(21) Appl. No.: 17/693,310

(22) Filed: Mar. 11, 2022

Related U.S. Application Data

(63) Continuation-in-part of application No. 29/795,085, filed on Jun. 16, 2021, and a continuation-in-part of application No. 29/763,823, filed on Dec. 24, 2020.

(51) Int. Cl.
*B44D 3/00* (2006.01)

(52) U.S. Cl.
CPC .................................... *B44D 3/006* (2013.01)

(58) Field of Classification Search
None
See application file for complete search history.

(56) References Cited

U.S. PATENT DOCUMENTS

| | | | |
|---|---|---|---|
| 2,761,165 | A | 9/1956 | Krzanowski |
| 2,825,916 | A | 3/1958 | Basala, Jr. |
| 3,019,467 | A | 2/1962 | Garrett |
| 3,707,740 | A | 1/1973 | Demers |
| 4,324,018 | A | 4/1982 | Olsson |
| 4,517,699 | A | 5/1985 | Petricka |
| 4,606,777 | A | 8/1986 | Brow |
| 4,708,152 | A | 11/1987 | Hibberd |
| 4,723,564 | A | 2/1988 | West et al. |
| 5,272,782 | A | 12/1993 | Hutt |
| 5,515,567 | A | 5/1996 | Washburn |
| 5,546,625 | A | 8/1996 | Mealey, Sr. |
| D386,857 | S | 11/1997 | Lawrence |
| 6,125,497 | A | 10/2000 | Galbreath |
| 6,530,109 | B1 | 3/2003 | Cassedy |

(Continued)

FOREIGN PATENT DOCUMENTS

| | | | |
|---|---|---|---|
| CA | 2300447 | A1 | 8/2001 |
| EP | 2226202 | A1 | 9/2010 |
| GB | 2408921 | A | 6/2005 |

OTHER PUBLICATIONS https://touchupcup.com/products/touch-up-roller-saver (Year: 2020).*

(Continued)

*Primary Examiner* — Rita P Adhlakha
(74) *Attorney, Agent, or Firm* — Sarah J. Rhoades

(57) ABSTRACT

An easy-to-use paint roller cleaning device with multiple cleaning members sized for interfacing with rollers and naps of various sizes while the user holds onto the device along a handle. The cleaning members have an opening encircled by a roller interface wall which squeezes tightly over the nap while its paint-scraping rim removes the paint or other liquid from the roller nap and the paint-guiding wall urges the liquid downward to exit the nap. The paint roll cleaner tool will scrape the entire length of the nap before clearing the tip of the nap farthest from the painting handle. The cleaning structures come in sizes suited for standard and mini rollers with a variety of naps including ¼ inch, ⅜ inch, and ½ inch.

20 Claims, 20 Drawing Sheets

(56) References Cited

U.S. PATENT DOCUMENTS

| | | | | |
|---|---|---|---|---|
| D511,600 | S | 11/2005 | Mowe et al. | |
| 8,806,696 | B2 | 8/2014 | Mowe | |
| 8,985,125 | B2 | 3/2015 | Schulz | |
| 2005/0138750 | A1 | 6/2005 | Trincilla et al. | |
| 2005/0273964 | A1 | 12/2005 | Hobbs | |
| 2006/0016464 | A1 | 1/2006 | Dominey | |
| 2006/0064836 | A1 | 3/2006 | Mowe | |
| 2009/0084419 | A1 | 4/2009 | Inglis | |
| 2010/0252077 | A1 | 10/2010 | Muraske | |
| 2012/0174946 | A1 * | 7/2012 | Young | B44D 3/006<br>134/6 |
| 2012/0255587 | A1 | 10/2012 | Schulz | |
| 2014/0068884 | A1 | 3/2014 | Vasquez | |

OTHER PUBLICATIONS

Roller Ready, Dec. 7, 2020, hhttp://rollerready.com/.
Go! Paint, Dec. 7, 2020, https://www.go-paint.com/en/products/clean-paint-rollers-fast-and-easy-roller-cleaner.

* cited by examiner

MULTI-SIZED PAINT ROLLER CLEANING DEVICE

CROSS-REFERENCE TO RELATED APPLICATIONS

This patent application claims priority under 35 U.S.C. § 120 to, and is a continuation-in-part of U.S. patent application Ser. No. 29/763,823, entitled "Paint Roller Cleaning Device", and filed on Dec. 24, 2020, which application is now pending. This patent application claims further priority under 35 U.S.C. § 120 to, and is a continuation-in-part of U.S. patent application Ser. No. 29/795,085, entitled "Paint Roller Cleaning Device", and filed on Jun. 16, 2021, which application is now pending. The entire disclosures of those patent applications are hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to a paint roller cleaning device, and more particularly to such a paint roller cleaning device with a variety of cleaning features sized to receive paint roller sleeves with a variety of diameters and naps with a variety of heights.

2. Description of the Related Art

Paint rollers are a helpful tool allowing painters to paint large, flat surfaces in much less time than a brush. Rollers are also excellent for use on all walls, stucco, concrete or any other flat surface. Standard roller length is nine inches but for smaller areas, a four-inch or seven-inch roller cover may be desired. For larger area walls and floors, 14-inch and 18-inch rollers may increase productivity. Roller covers consist of a rigid core which usually has standard diameter of 1½ inch while a mini roller has a diameter close to or less than 1 inch. Each roller size offers a variety of nap heights or depths affixed to the rigid core. The nap is determined by the surface texture to be painted where ¼-inch to 3/16-inch are used for very smooth surfaces like metal doors and plaster. The pile depth on naps of ⅜-inch to ½-inch are useful for smooth and semi-smooth surfaces like drywall. Larger naps of ¾-inch should be used for semi-rough surfaces like wood or a textured ceiling. Rollers are typically constructed of nylon/polyester, natural fibers or blends. Synthetic roller covers of nylon/polyester are ideal for applying latex paints. They resist matting and hold their shape for a smooth finish. Roller covers that are made from natural fiber include mohair and lamb's wool. They are ideal for oil-based coatings. Roller covers made from a blend of natural and synthetic fibers are excellent multipurpose covers and can be used with all paints. No matter the material of the roller, cleaning the roller can be a chore where deeper piles absorb more paint and are even more difficult to clean.

Standard methods of cleaning paint rollers have included rinsing the roller under miming water or soaking them for long periods of time. Users then squeeze the paint and water off the roller using their hands which can be quite messy and could irritate skin. These methods do not allow the user to remove excess paint from the roller before washing, which results in loss of paint.

There have been a considerable number of efforts made to develop a satisfactory device for cleaning wet paint from paint roller covers. Users wish to recover and retain left-over paint for future use and need to be able to scrape the paint remaining on the rollers back into the can, bucket, or other storage container so that it can be re-sealed. Additionally, after scraping excess paint back into the storage containers, users want to be able to wash the roller covers, remove excess water, and allow the rollers to dry for future re-use. Failure to properly clean the paint roller covers after use will require the covers to be discarded. Purchasing replacement paint roller covers for each job can be quite costly.

Several disclosures have been made of devices useful in cleaning paint roller covers many of which require compression pressure to be exerted upon them as the device is passed down over the roller in order to squeeze the excess paint from the roller cover. Other known devices do not completely surround the paint roller to allow for size variation and also to allow the devices to be applied to the frame. Devices having a split or opening in them leave strips of paint and require multiple passes with the device to remove all excess paint. Other products include a hose or water attachment mechanism which does not allow the excess paint to be removed from the roller before the roller is cleaned.

BRIEF SUMMARY OF THE INVENTION

A multi-nap size paint roller cleaning device is provided with a handle having cleaning structures located along it. The roller cleaner device includes more than one cleaning member. When the device has two cleaners, they occur on either end or when more than two are included, the third cleaning member occurs along the handle's length. In one embodiment, this centrally disposed cleaning member accommodates a mini paint roller. The handle is sized to fit the hand of a user and long enough to permit the user leverage as he/she applies a force to pull the cleaning structures along the length of a paint roller, scraping the nap.

Each cleaning structure comprises an opening encircled by a roller interface wall, a paint-scraping rim having an inner circumference and an outer circumference, the inner circumference of the paint-scraping rim adjacent to the roller interfacing wall, and a paint-guiding wall annularly extending from the outer circumference of the paint-scraping rim. The paint-scraping rim is smaller in shape including depth and circumference than the paint-guiding wall.

The paint roller cleaner has a variety of functions. Beyond cleaning a paint roller, it also reduces messes and potential skin irritation because it allows a painter to clean up without touching the roller nap. A particular technique of use allows removal of the paint sleeve itself from the roller frame by using leverage applied by the paint roller cleaner.

The device is easy-to-use and permits an improved method for removing excess liquid from a paint roller nap.

The appropriate cleaning member of the paint roller cleaning device is selected and is threaded over the paint roller handle and frame. The nap sleeve is then inserted into the appropriate opening over a container. As the paint roller frame/handle is firmly grasped in one hand, the cleaning tool is pulled over the nap around which it is tightly in contact, by a downward pressure applied away from the roller handle, and forcing paint from the nap sleeve. At the end of the nap sleeve, the cleaner is removed from the paint sleeve and rinsed under warm water until water runs clean.

The device can also be used for cleaning the paint roller after the paint has been extracted. To thoroughly clean the roller for future use: after the nap is rinsed with water, the cleaning member of the device encircles the paint roller nap as it is slowly pulled over the paint roller cleaner. Now, the excess water has been removed in the same manner that the paint was previously removed. The extraction of the excess water will reduce the roller drying time significantly. The same technique can be used with water, turpentine, or other cleaner.

For added convenience, the paint roller cleaning device can also be used to remove the paint sleeve from the paint roller's frame. This enables the sleeve to be transferred to a sink for rinsing under warm water, to a drying rack or to another receptacle without coming into contact with the painter's hands or skin. For this method of cleaning and removal with the present invention, under running water, a first pass of the device will clean and extract water from the roller. Upon a second pass of the device, the sleeve is removed from the frame after the device is pulled half-way down the sleeve, then, the tool is turned at an angle to create a frictional force grabbing the sides of the nap. While the device is firmly held with the force applied to the nap, the roller sleeve is gently pulled from the roller cage or handle.

Each opening is configured to receive a paint roller frame and paint roller core and each paint-scraping rim is sized to tightly interface with the nap. More specifically, and in a presently preferred embodiment, by way of example and not necessarily by way of limitation, one embodiment of the paint roller cleaning device accommodates (1) mini paint roller sleeves with shorter naps (some approximating ¼ inch (6 mm)), and (2) standard rigid core where the first cleaner accommodates approximately ⅜ inch (10 mm) nap the second cleaner is suited to naps of approximately 9/16 inch to ½ inch (15 mm). In another embodiment the device can accommodate paint roller sleeves with both larger and narrow rigid cores and varying nap heights.

The paint roller cleaner device tool is made of highly durable certified polyethylene plastic. This material ensures a sturdy and rigid construction with longevity and endurance. The device is desirably constructed of material that is resistant to paint adherence and is easy to clean. The device will preferably have smooth, round, or beveled edges to interact with the paint roller.

The paint roller cleaning device improves the painting job. A used roller absorbs more paint from the tray, meaning it will cover more wall. The used roller has already lost loose fibers, so they won't be left on the wall. A new paint roller cover is nice, but it is less efficient than a paint roller cover that has already been worn in. A new cover holds less paint, so a user must return to the paint tray more often. Furthermore, a new roller cover can leave lint on the freshly painted wall. The user must either de-lint a new roller or pick lint from the wall. Both are time consuming and frustrating.

The paint roller cleaning device encourages painters to clean rather than throw away, rollers. A roller can hold a large amount of paint, and they are not cheap; tossing them after every job is neither cost efficient, nor environmentally friendly. The present invention makes the job hassle free, easy and quick, taking the chore out of cleanup.

The paint roller cleaner device saves time and money, while eliminating the mess. With only one swipe, or pass over the nap, the paint roller cleaner device digs deep, drawing paint from the base of the sleeve pulling it back to the bucket or container. This saves paint in that the excess paint can be returned to the container for the next painting job instead of being wasted or left behind on the roller, ruining the roller for future use. The device removes paint from rollers in one pass and can be used to remove excess water from the roller after washing. The single-pass functionality and superior performance saves painters significant time. Because the paint roller cleaner device thoroughly cleans the nap, it rejuvenates it for future use. With consistent use of the easy and gentle paint roller cleaner device, a painter can reuse a roller time after time instead of buying a new roller for every job, thereby also saving money and reducing waste.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

DETAILED DESCRIPTION OF THE INVENTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Figure 1:
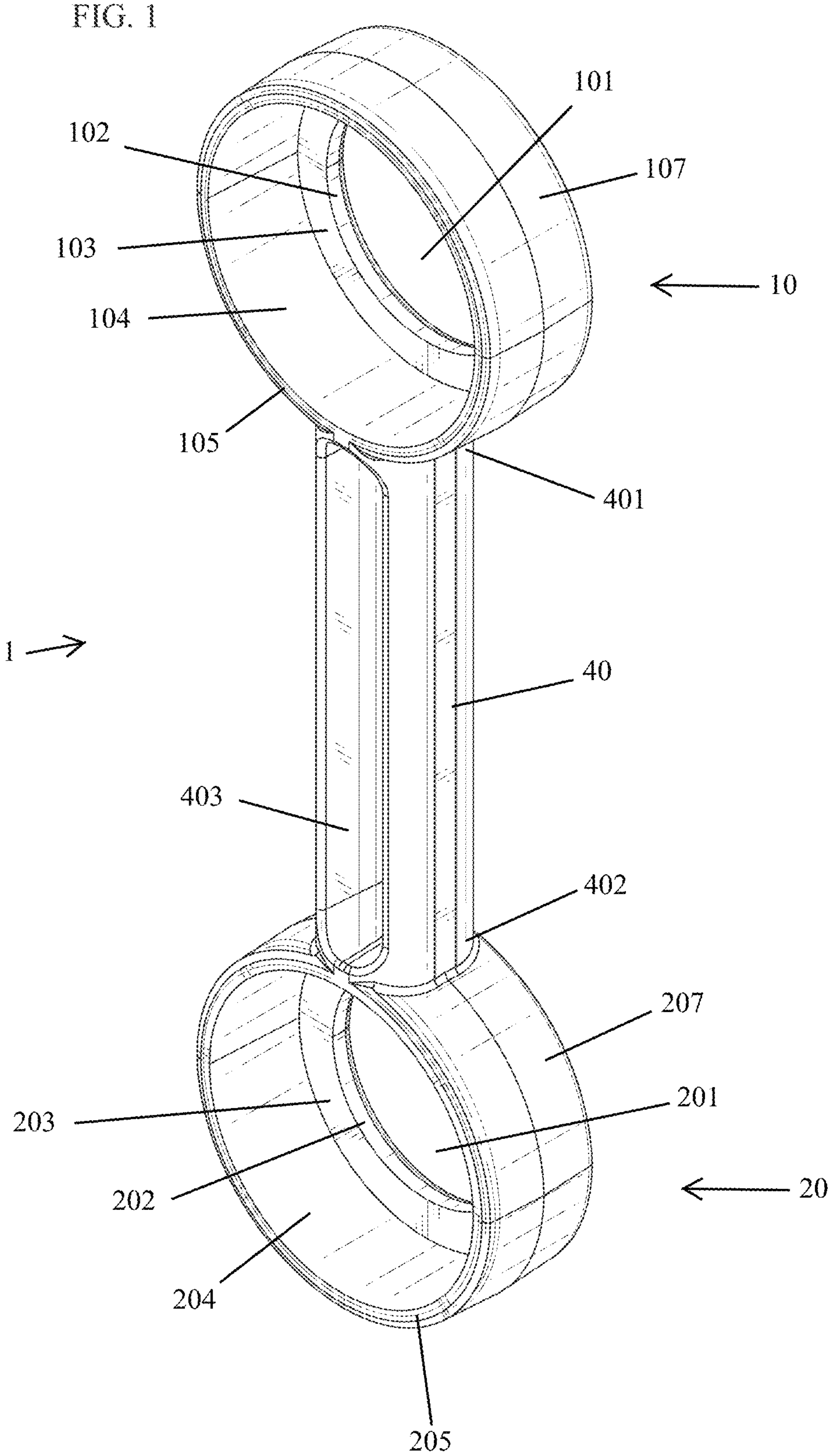
FIG. 1 is a perspective view of one embodiment of the paint roller cleaning device having a cutout handle and two cleaning sleeves.
Figure 2:
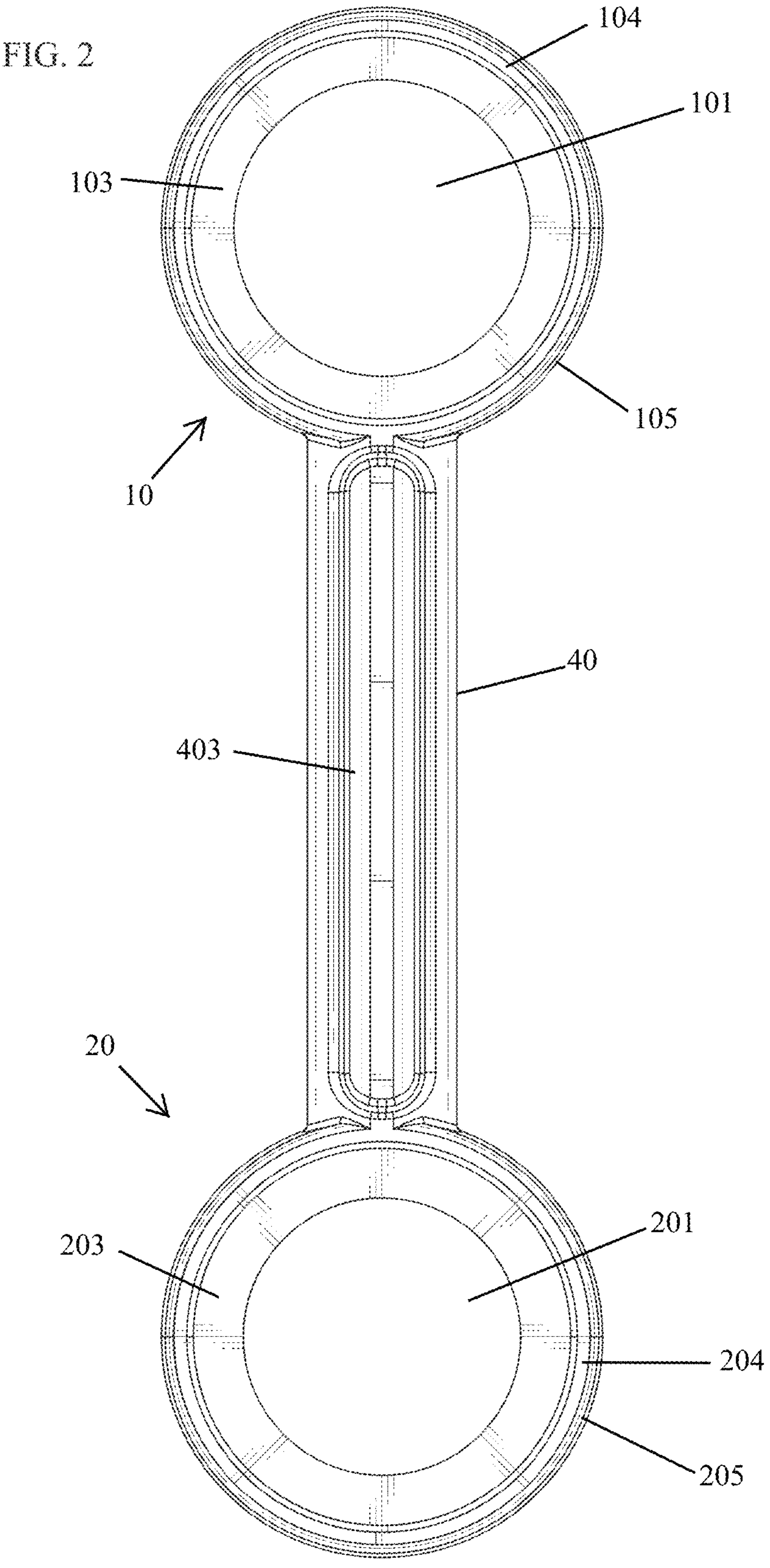
FIG. 2 is a bottom view of the embodiment shown in FIG. 1.
Figure 3:
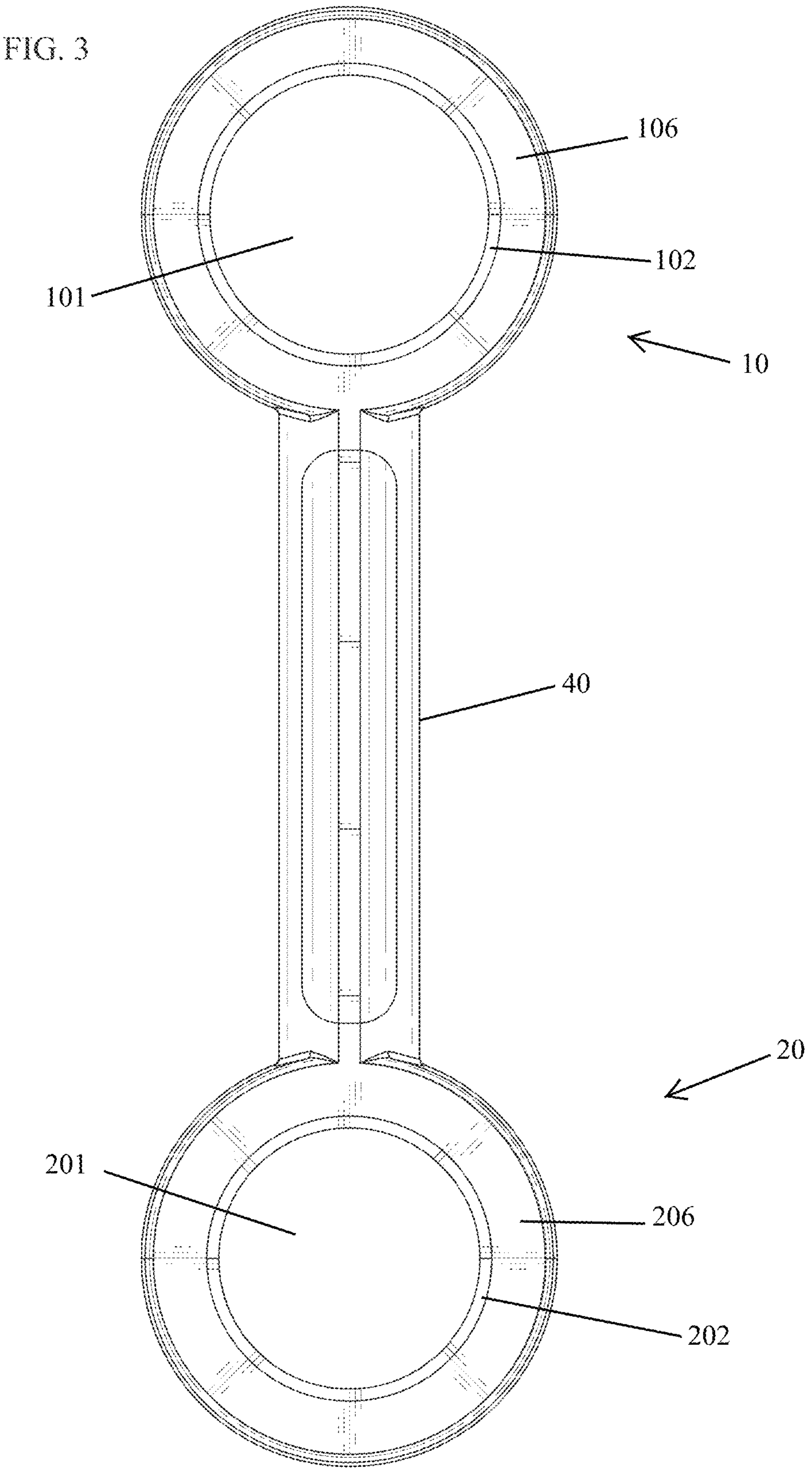
FIG. 3 is a top view of the embodiment shown in FIG. 1.
Figure 4:
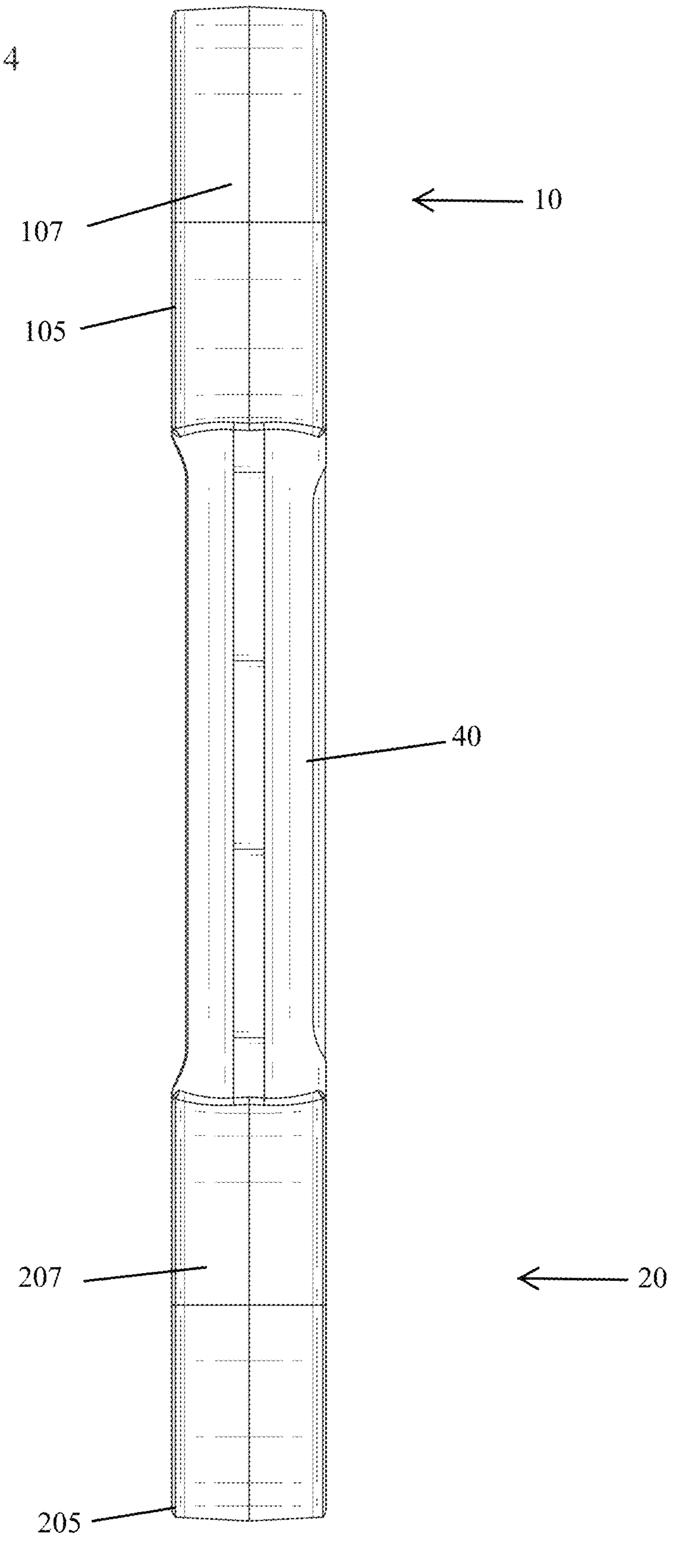
FIG. 4 is a first side view of the embodiment shown in FIG. 1.
Figure 5:
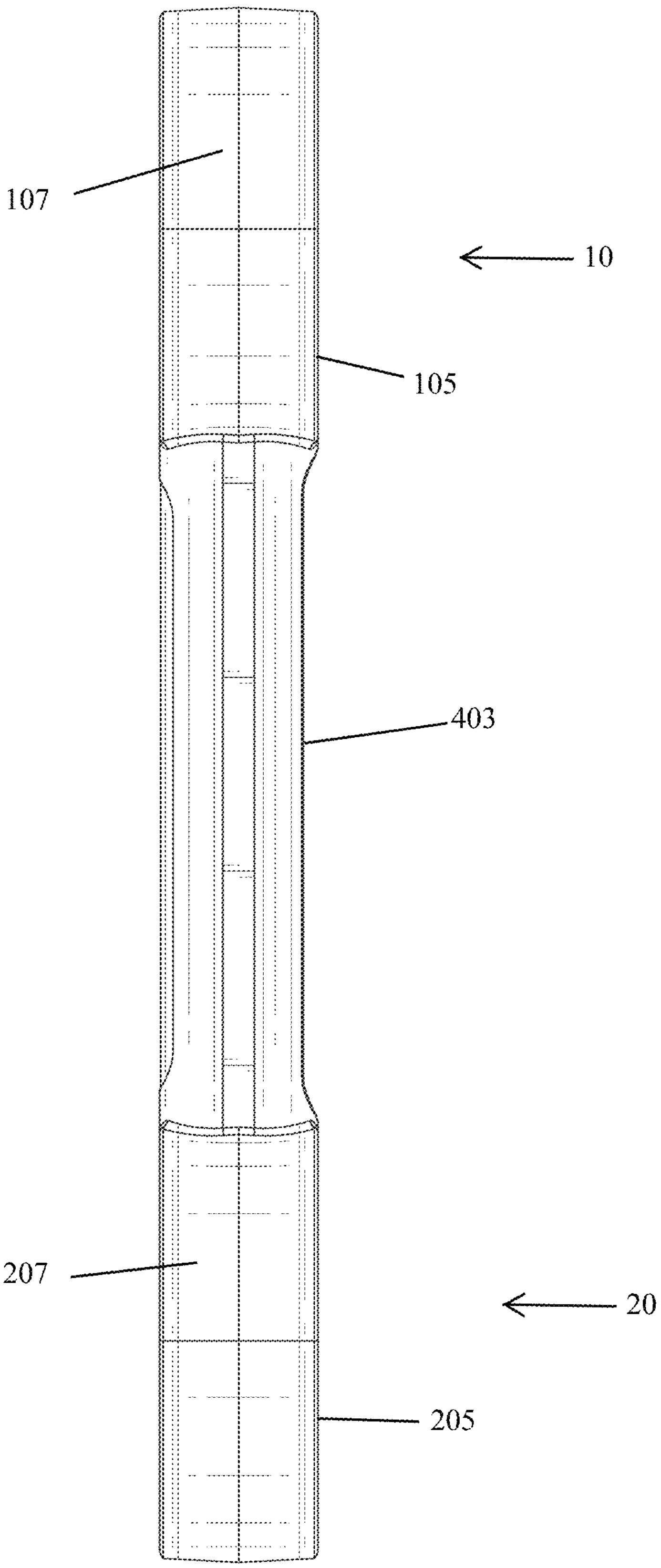
FIG. 5 is a second side view of the embodiment shown in FIG. 1.
Figure 6:
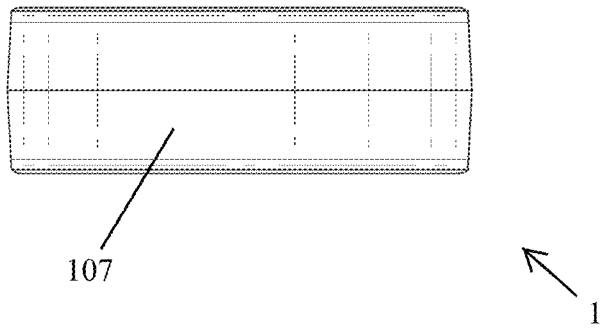
FIG. 6 is a first end view of the embodiment shown in FIG. 1.
Figure 7:
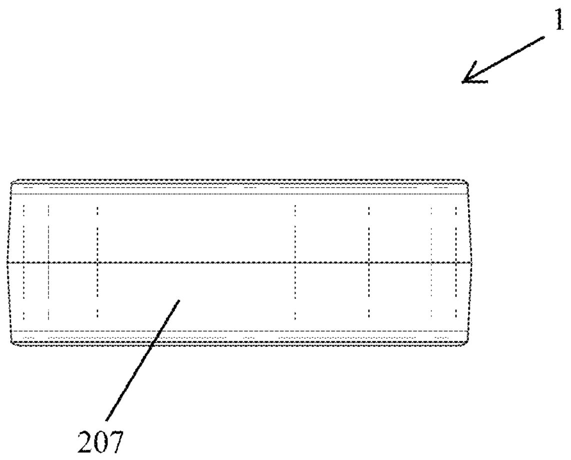
FIG. 7 is a second end view of the embodiment shown in FIG. 1.
Figure 8:
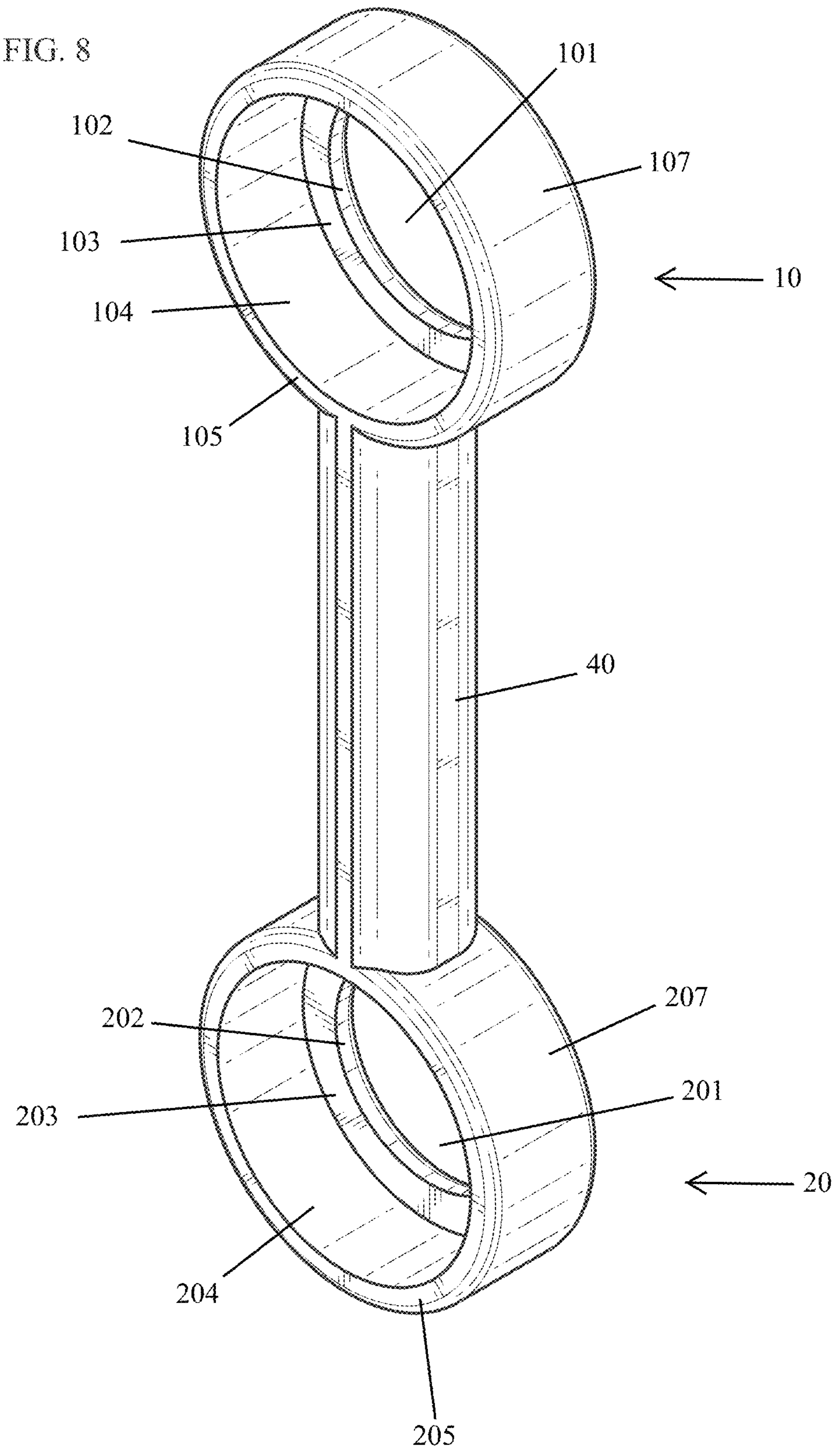
FIG. 8 is a perspective view of another embodiment of the paint roller cleaning device showing a solid handle and two cleaning sleeves.
Figure 9:
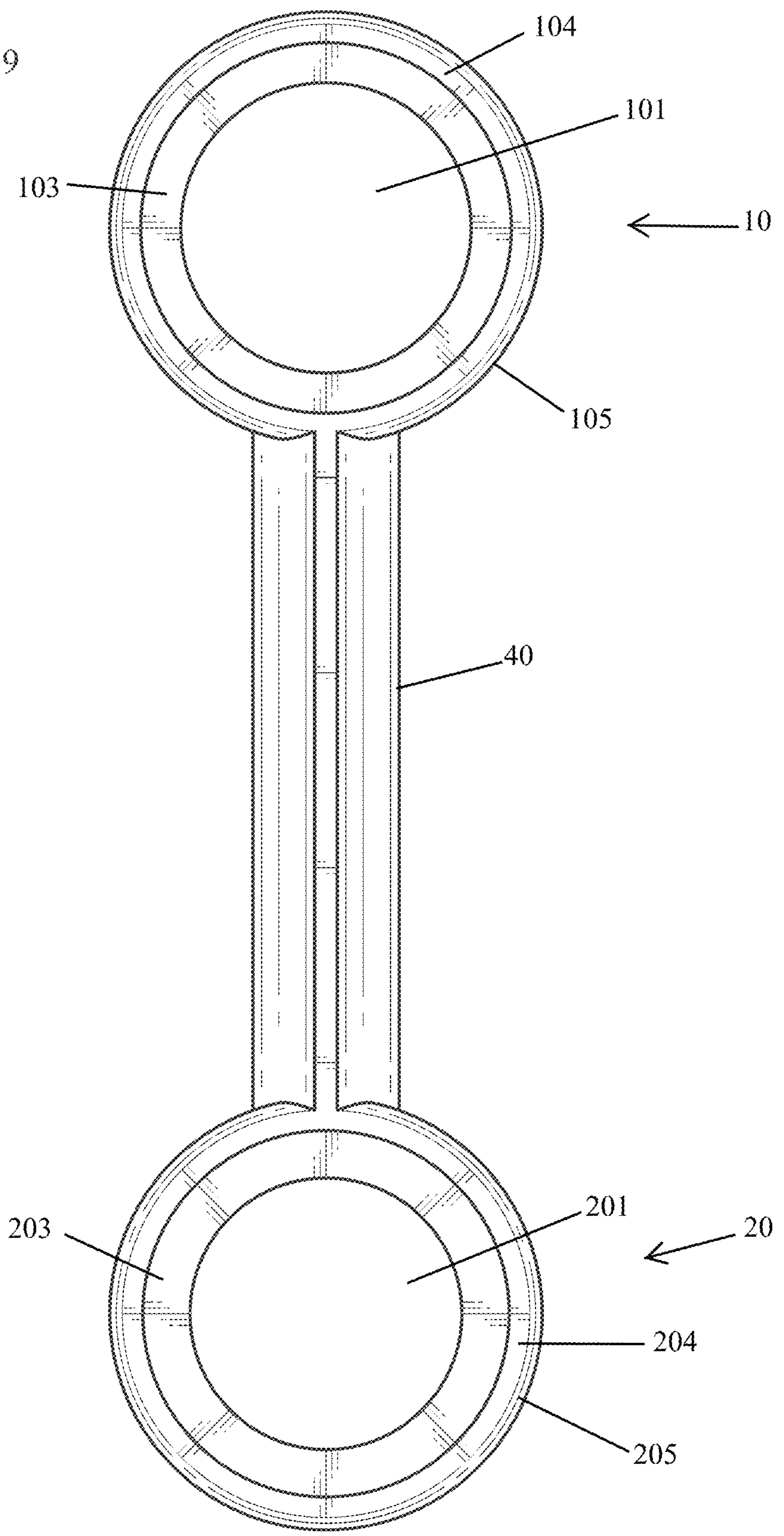
FIG. 9 is a bottom view of the embodiment shown in FIG. 8.
Figure 10:
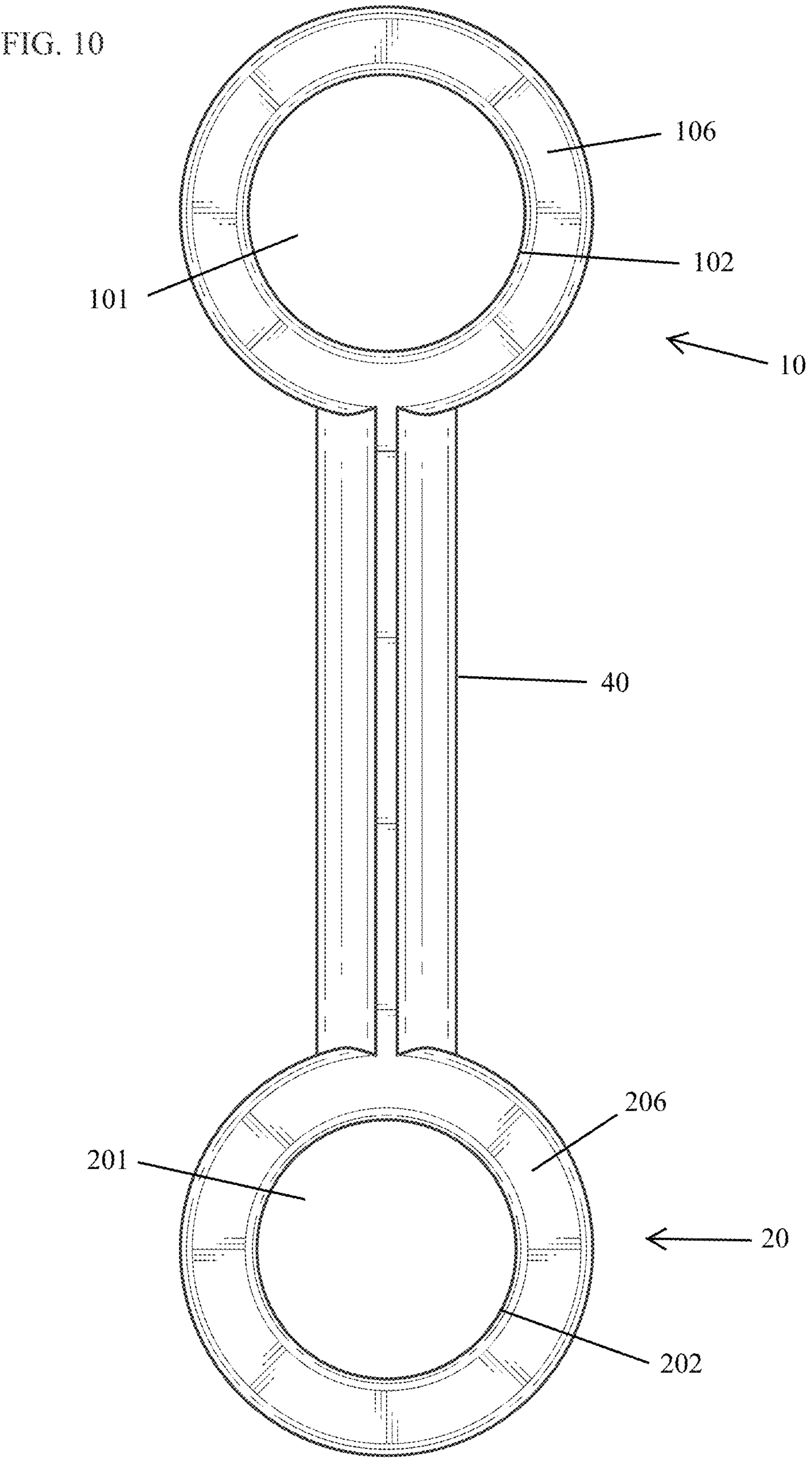
FIG. 10 is a top view of the embodiment shown in FIG. 8.
Figure 11:
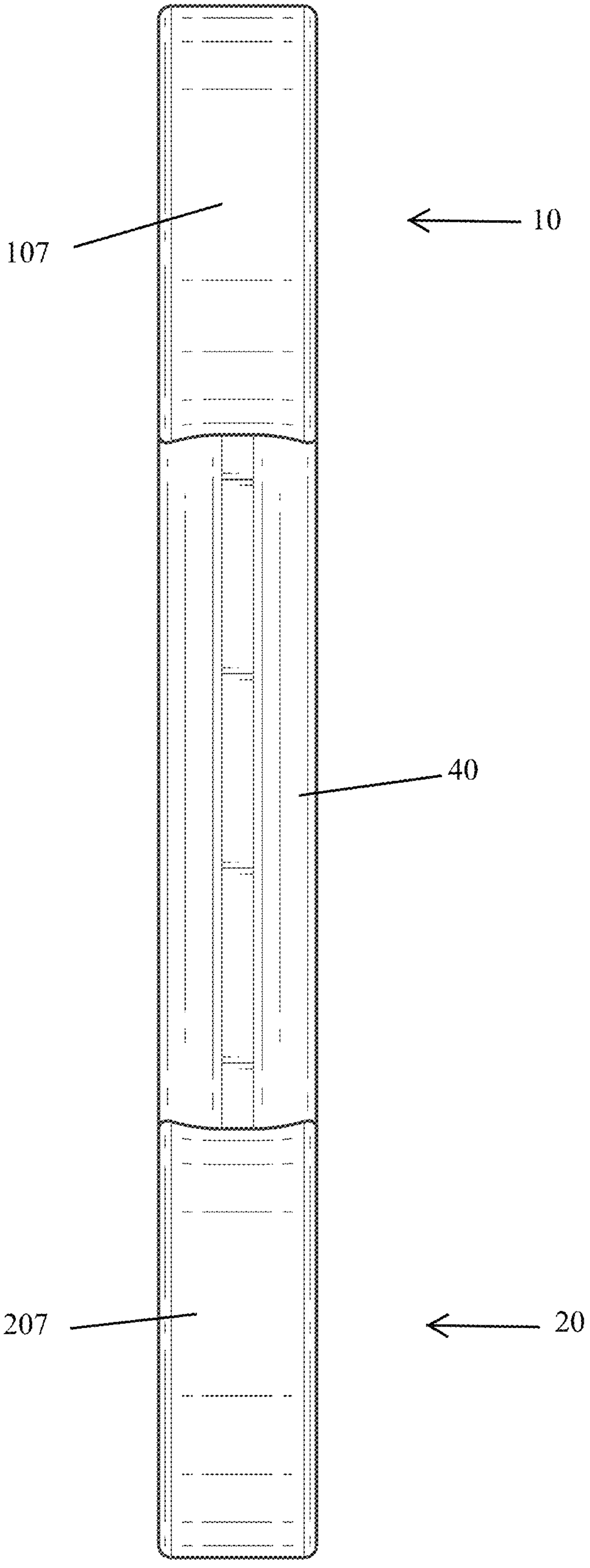
FIG. 11 is a first side view of the embodiment shown in FIG. 8.
Figure 12:
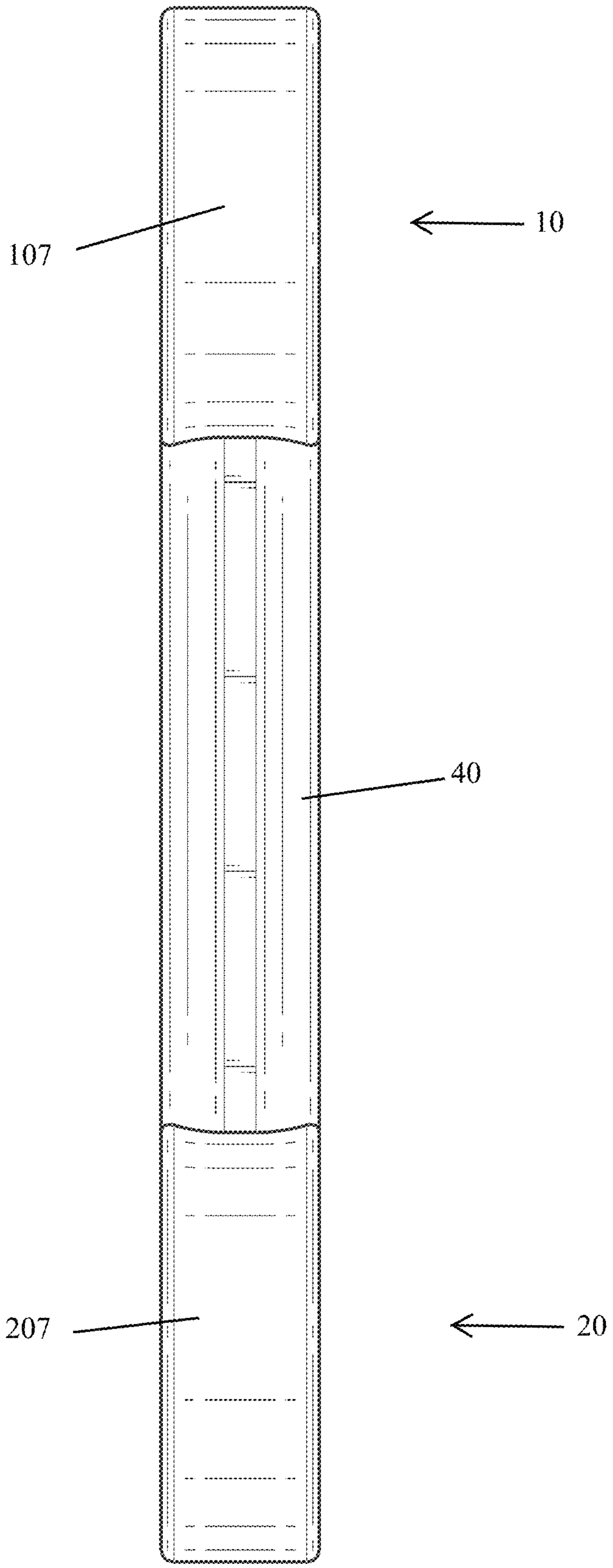
FIG. 12 is a second side view of the embodiment shown in FIG. 8.
Figure 13:
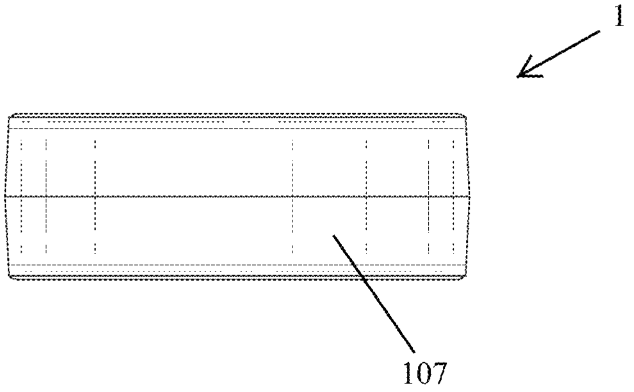
FIG. 13 is a first end view of the embodiment shown in FIG. 8.
Figure 14:
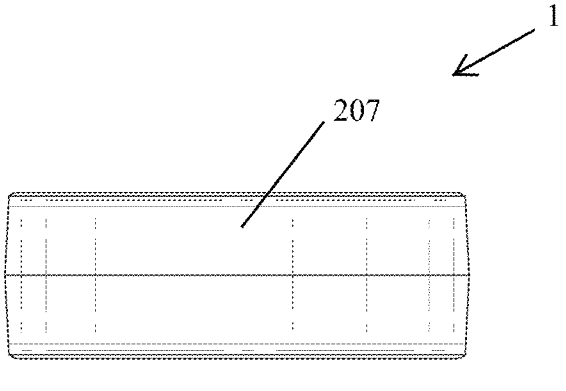
FIG. 14 is a second end view of the embodiment shown in FIG. 8.
Figure 15:
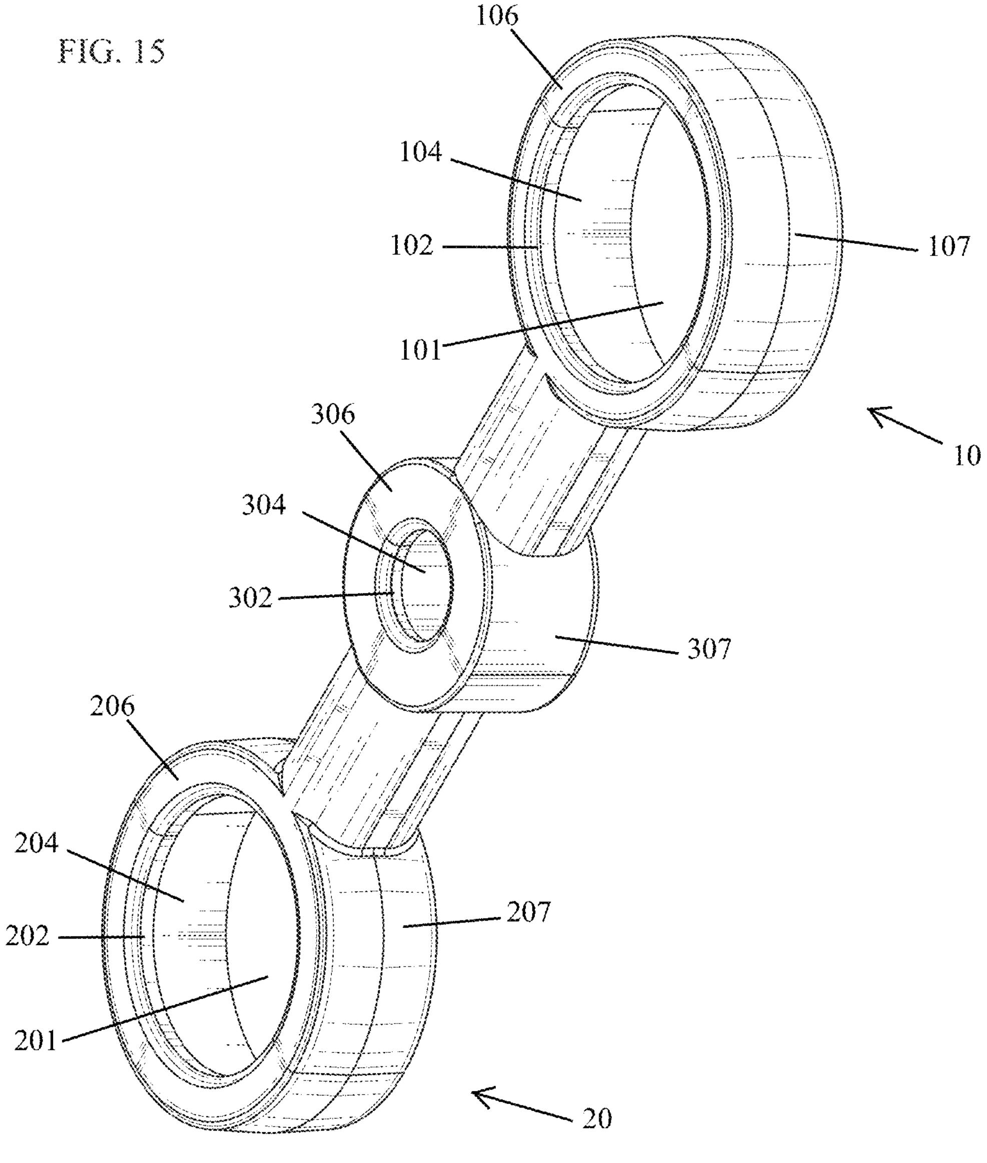
FIG. 15 is a top perspective view of a preferred embodiment of the paint roller cleaning device having three cleaning sleeves.
Figure 16:
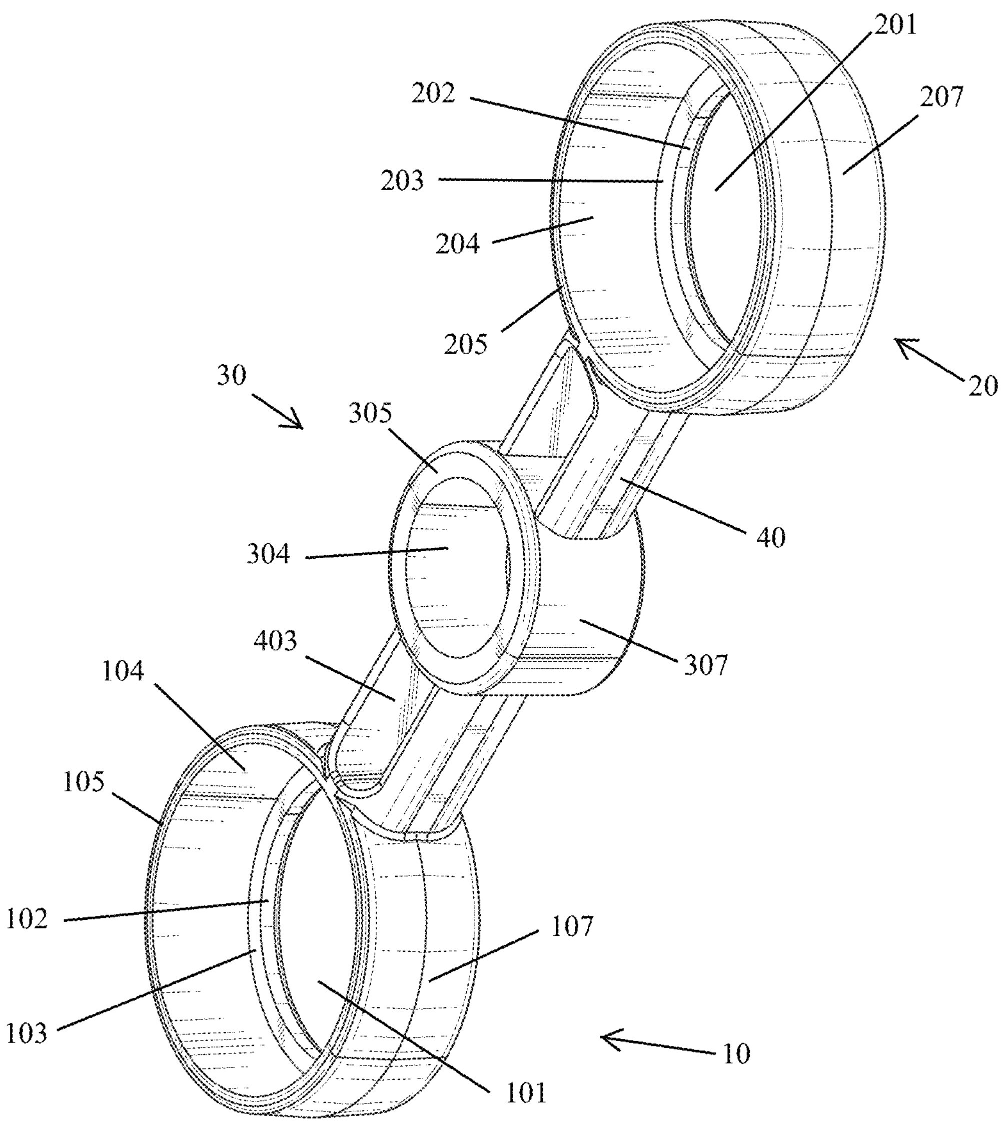
FIG. 16 is a bottom perspective view of the embodiment shown in FIG. 15.
Figure 17:
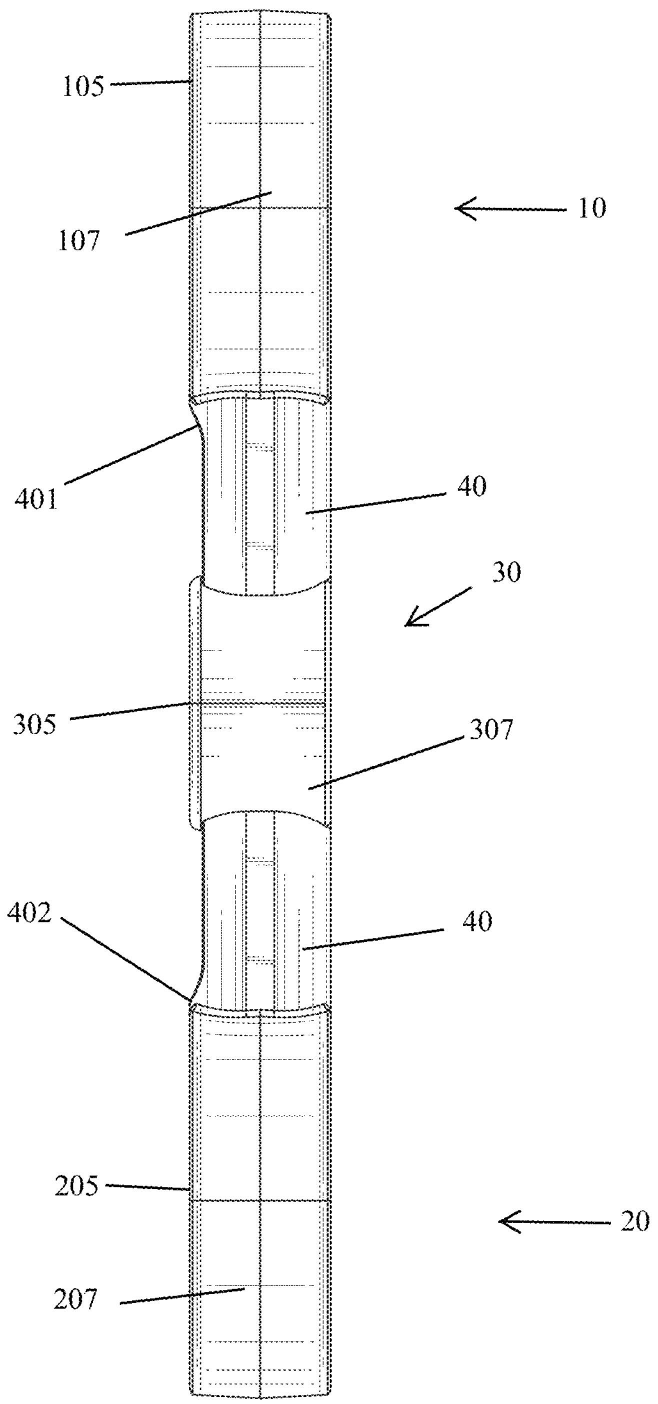
FIG. 17 is a first side view of the embodiment shown in FIG. 15.
Figure 18:
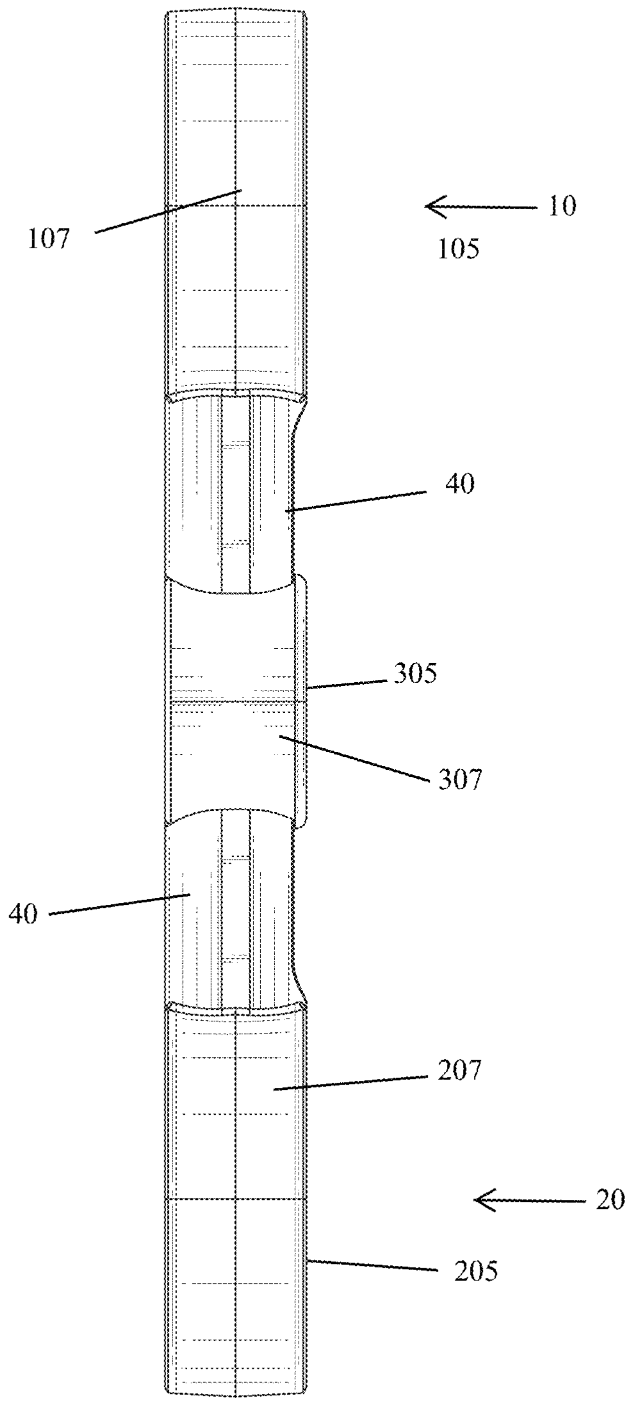
FIG. 18 is a second side view of the embodiment shown in FIG. 15.
Figure 19:
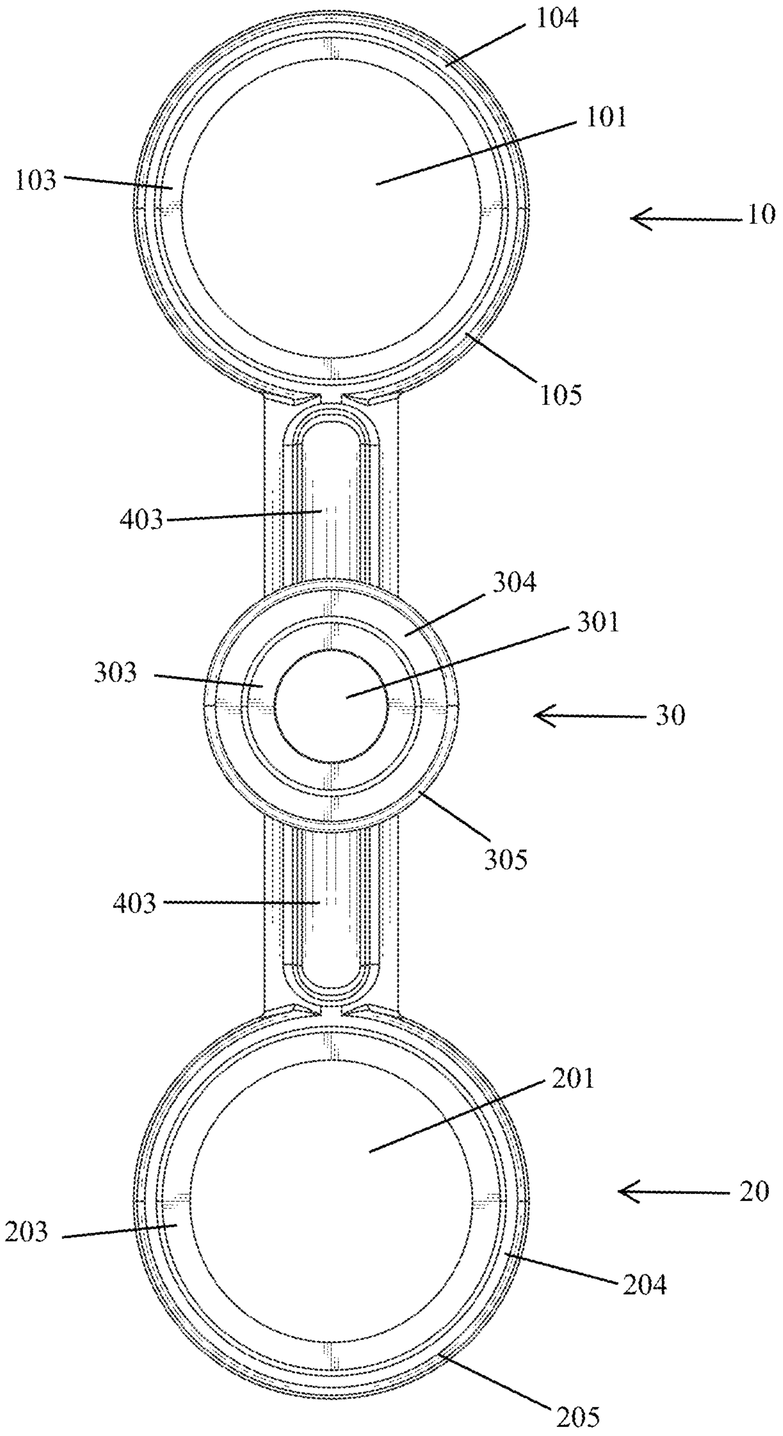
FIG. 19 is a bottom view of the embodiment shown in FIG. 15.
Figure 20:
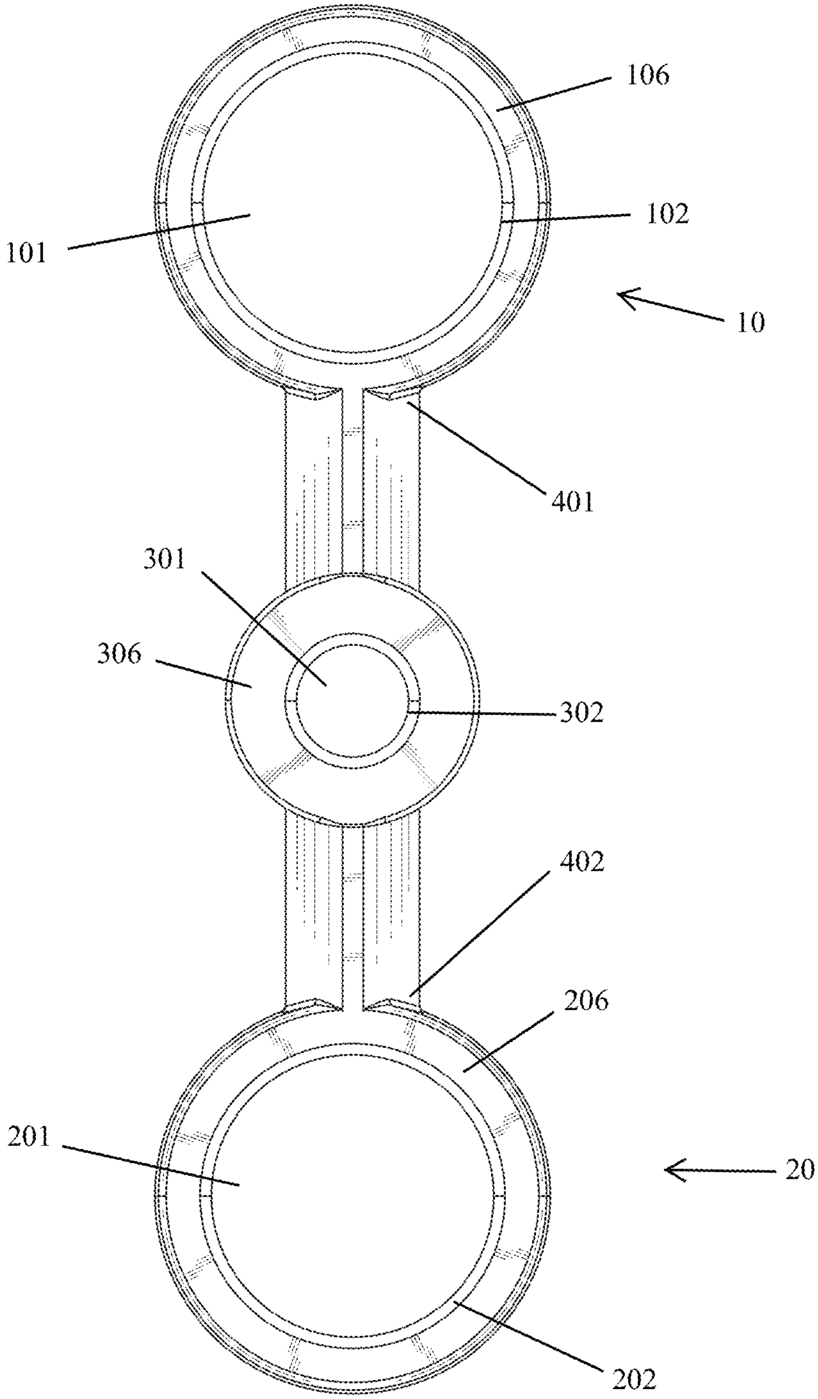
FIG. 20 is a top view of the embodiment shown in FIG. 15.
Figure 21:
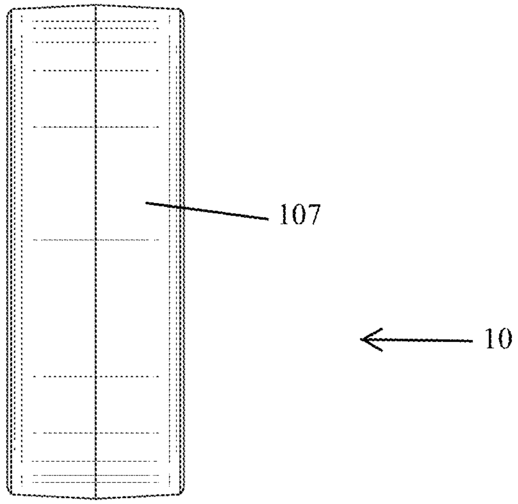
FIG. 21 is a first end view of the embodiment shown in FIG. 15.
Figure 22:
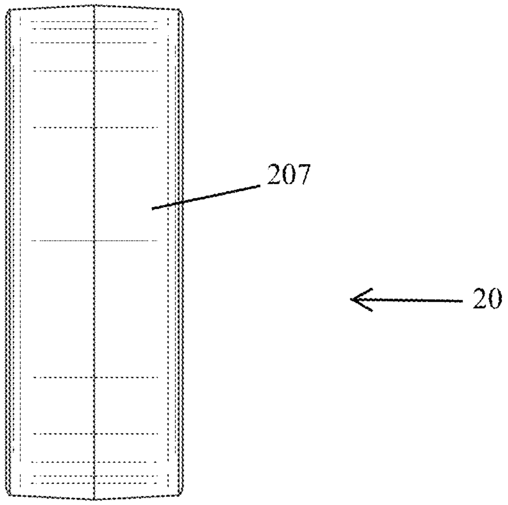
FIG. 22 is a second end view of the embodiment shown in FIG. 15.

FIG. 1 displays one embodiment of the paint roller cleaning device 1 with two cleaning members. The particular example employs a handle 40 with a first end 401, second end 402 and has an optional cutout section 403. Characteristic of the cutout handle is a skeletal construction permitting the device to retain structure and strength but eliminating excess material and weight. This embodiment is further detailed in FIGS. 2-7. FIGS. 8-14 demonstrate an example of a handle 40 with a more solid construction.

With reference to FIGS. 1-14, the first cleaning sleeve 10 is located on the opposite end of the handle from the second cleaning sleeve 20. The first cleaning sleeve 10 located at the first end of the handle 401 has its own roller frame receiving opening 101, roller interface wall 102, an interior paint-scraping rim 103 formed of an axially extending, horizontal wall having an exterior top rim 106 opposite its scraping rim 103. The inner circumference of the scraping rim 103 is adjacent to the roller interface wall 102 and the exterior circumference of the scraping rim 103 is adjacent to the first paint-guiding wall 104. The first paint-guiding wall 104 is an elongated ring with an annular wall. The annular wall has an exterior side wall 107 and terminates at a bottom edge 105. The circumference of the paint-guiding wall 104 is larger than the opening 101. The circumference of the paint-guiding wall 104 is larger than the circumference of the paint-scraping rim 103. The example of the first cleaning member described here cooperates with paint rollers 50 having a larger rigid core and nap height 501 in the range approximating ⅜ inch to ½ inch (10-15 mm).

With continuing reference to FIGS. 1-14, the second cleaning sleeve 20 is located at the second end of the handle 402 opposite from the first cleaning sleeve 10. The second cleaning sleeve 20 has its own roller frame receiving opening 201, roller interface wall 202, an interior paint-scraping rim 203 formed of an axially extending, horizontal wall having an exterior top rim 206 opposite its scraping rim 203. The inner circumference of the scraping rim 203 is adjacent to the roller interface wall 202 and the exterior circumference of the scraping rim 203 is adjacent to the second paint-guiding wall 204. The second paint-guiding wall 204 is an elongated ring with an annular wall. The annular wall has an exterior side wall 207 and terminates at a bottom edge 205. The circumference of the paint-guiding wall 204 is larger than the opening 201. The circumference of the paint-guiding wall 204 is larger than the circumference of the paint-scraping rim 203. The example of the second cleaning member described here cooperates with paint rollers 50 having a larger rigid core and shorter nap height 501 in the range approximating ¼ inch (8 mm).

Turning to FIGS. 15-22, a device 30 includes a mini-roller cleaning member centrally disposed on the handle 40. The mini roller cleaning sleeve 30 is located on the handle 40. In this example, the mini roller cleaning sleeve is located in between the first cleaning sleeve 10 and the second cleaning sleeve 20. The mini roller cleaning sleeve 30 has its own roller frame receiving opening 301, roller interface wall 302, an interior paint-scraping rim 303 formed of an axially extending, horizontal wall having an exterior top rim 306 opposite its scraping rim 303. The inner circumference of the scraping rim 303 is adjacent to the roller interface wall 302 and the exterior circumference of the scraping rim 303 is adjacent to the third paint-guiding wall 304. The third paint-guiding wall 304 is an elongated ring with an annular wall. The annular wall has an exterior side wall 307 and terminates at a bottom edge 305. The circumference of the third paint-guiding wall 304 is larger than the opening 301. The circumference of the third paint-guiding wall 304 is larger than the circumference of the paint-scraping rim 303. The example of the mini-roller cleaning member described here cooperates with mini paint rollers 50 having a smaller rigid core with a circumference close to or less than 1 inch and the device may be used on mini rollers with varying nap heights.

Figure 23:
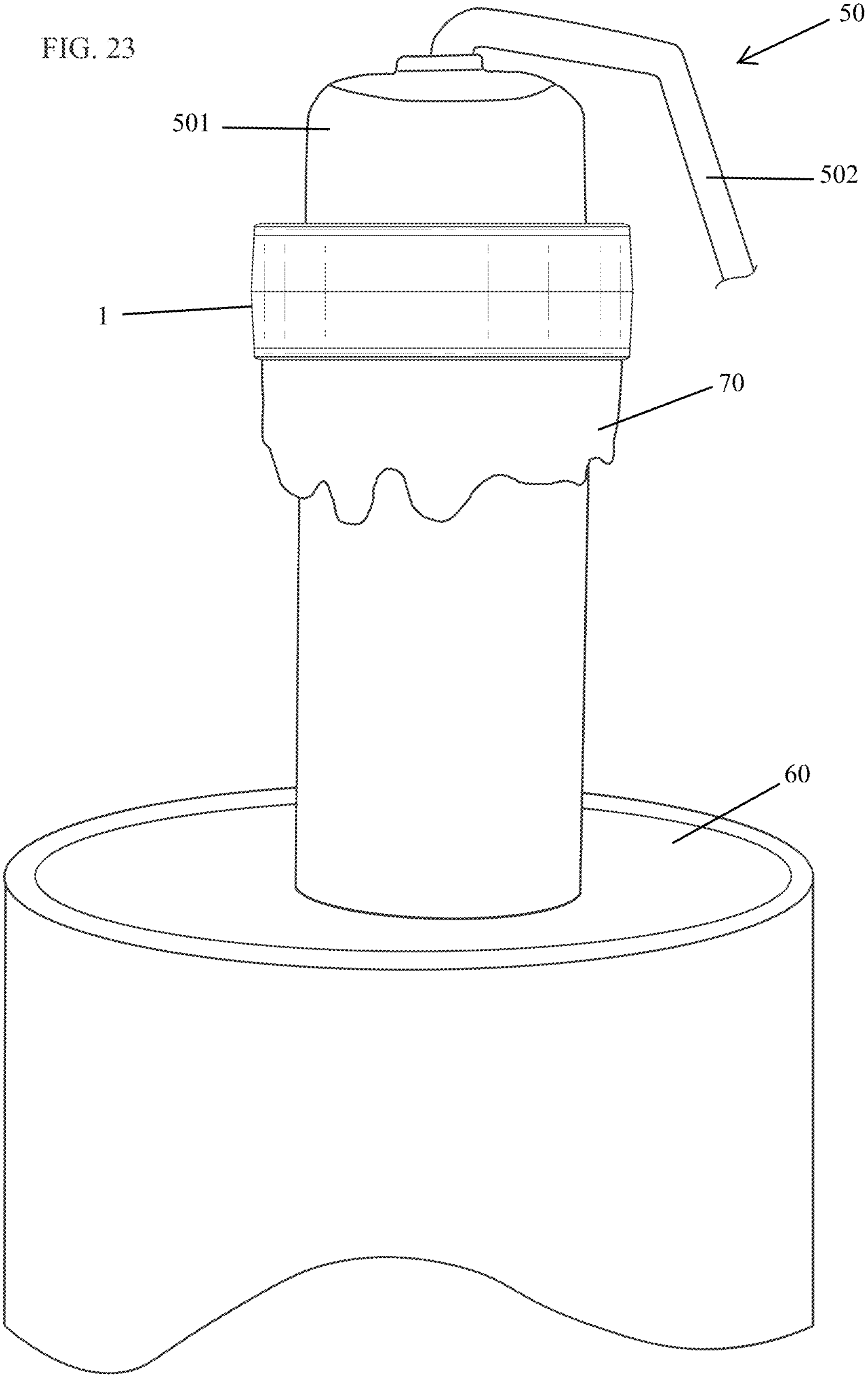
FIG. 23 is a schematic illustration of the present invention in use over a paint roller soaked with paint and being scraped clean by the paint roller cleaning device into a container.

In FIG. 23, the device 1 is demonstrated during use with the paint roller 50 turned vertically above a paint-catching receptacle 60. In this view the paint roller frame 502 has been threaded through device opening 101 and is already begun scraping excess paint 70 from the nap 501. The user would continue pressing downward on the handle 40 until the device passes the end of the roller opposite the frame 502 and all excess paint will have fallen into the below receptacle 60. Once the device and paint roller are separated, they can be moved to a washing station for cleaning. The steps of threading the device over the handle and scraping the length of the roller would be repeated to remove excess water in a similar manner has shown in FIG. 23. The device 1 is easy-to-use and permits an improved method for removing excess liquid from a paint roller nap 501. One example embodiment permits the easy cleaning of paint roller sleeves with nap heights of ¼-inch (6 mm), ⅜-inch (10 mm), 9/16-inch, and ½-inch (15 mm).

To begin using the paint roller cleaning device, the user chooses a cleaning structure matching the size of the roller and threads the device opening over the paint roller handle and frame. The nap sleeve 501 is then inserted into the appropriate opening over a container 503. The user holds the device 1 firmly in one hand and the paint roller handle 502 in the other and pulls the paint roller cleaning device 1 over the paint roller 50, away from the roller handle 502 forcing paint from the nap sleeve 501. More particularly, the roller interface wall 102 will contact the roller sleeve 50 at the base or narrowest point of the nap 501. As the interface wall 102 slides down the length of the roller 50 it will scrape excess paint 70 from the nap 501. The nap 501 will be allowed to pass between the interface wall 102 and roller sleeve once the paint saturating the nap has been removed. As the device is moved down the roller sleeve the excess paint will be controlled and guided by the wall 104. At the end of the nap sleeve the cleaner is removed from the paint roller handle. The nap may then be rinsed under warm water or with other cleaning agents.

The device can be used for cleaning the paint roller after the paint has been extracted. The cleaning member of the device 1 encircles the paint roller nap 501 as the user slowly pulls the paint roller cleaner over the nap after the nap is rinsed with water. Now, the user is removing excess water in the same manner that the paint was previously removed. The process may be repeated, if necessary, until water runs clean. The extraction of the excess water will cut the roller drying time significantly and fluffing will further aid drying. The same technique can be used with water, turpentine, or other cleaner to thoroughly clean the roller for future use. The preferred embodiment is constructed of paint resistant materials which make the device easy to clean. The device will have smooth or rounded edges to interact with the paint roller in a gentle manner.

For added convenience, the paint roller cleaning device can also be used to remove the paint roller sleeve from the paint roller frame. This enables the sleeve to be transferred to a sink for rinsing under warm water, to another receptable, or to a rack for drying without the user ever having to touch the sleeve and get paint on their hands. For this method of cleaning and sleeve removal with the device, the paint roller cleaning device is moved over the roller sleeve a second time. After pulling the device half-way down the sleeve, then, the tool is put on an angle to connect with the sleeve at the interior wall (102, 202, or 302) and also the bottom edge (105, 205, or 305). The bottom edge will hold the roller nap gently allowing the roller frame to be pulled from the roller cage.

With only one swipe, or pass over the nap, the paint roller cleaner device digs deep, drawing paint from the base of the sleeve pulling it back to the bucket or container. The paint roller cleaner device saves time and money, while eliminating the mess. The paint roller cleaner device permits limitless reuse of paint rollers so that users can stop buying a new roller for every job. With the ease and gentleness of the paint roller cleaner device, a painter can reuse a roller time after time which saves money and reduces waste.

The paint roller cleaner device commercially marketed as the Clean Sleeve paint roll cleaner accommodates multiple sizes of rollers and nap lengths—Clean Sleeve easily cleans roller sleeves with ¼ inch (6 mm), ⅜ inch (10 mm), and ½ inch (15 mm) naps with only one pass.

The paint roller cleaner works because each end boasts an enclosed opening at the bottom of a fluted bowl. These devices are dimensioned to fit snug enough around the roller cover as to pull out the most amount of product without damaging the fibers. Each end is specifically sized (and clearly marked on the handle) in order to clean numerous sizes of covers, meaning the user does not require a new tool for each cover size. The certified, polyethylene construction is paint resistant and smooth. The user does not need to dig in or push toward the cover while pulling toward the end of the cover, making it easy to use. The plastic has enough give to be gentle, but enough firmness to get the job done with a single swipe.

The Clean Sleeve commercial embodiment cleans in two ways. First, the roller handle is threaded through the desired opening (the sizes are clearly marked on each end). The cover is inserted into the opening and the Clean Sleeve is slowly pulled down, pushing the paint back into the pail. The tool is carefully pulled from the cover and the tool and cover are both rinsed under warm water until the water runs clear. The Clean Sleeve is pulled over the cover once in each direction, then the roller is fluffed and allowed to stand to dry. As an additional use, the end of the cover is inserted into the Clean Sleeve and the tool is slowly pulled toward the roller handle. Once the tool hits the handle, the tool is pulled back over the sleeve, allowing the tool to pull the sleeve from the cage, and both are rinsed under water and run through the tool once in each direction to pull out the water, the roller nap is fluffed and allowed to stand to dry.

It is further intended that any other embodiments of the present invention which result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. A multi-size paint roller cleaning device comprising:
- a handle,
- more than one cleaning member disposed along a length of the handle,
- each cleaning member having
  - an opening encircled by a roller interface wall,
  - a paint-scraping rim having an inner circumference and an outer circumference,
  - the inner circumference of the paint-scraping rim having a smooth beveled edge adjacent to the roller interfacing wall,
  - a paint-guiding wall annularly extending perpendicularly from the outer circumference of the paint-scraping rim.

2. The device of claim 1 comprising three cleaning members.

3. The device of claim 2 wherein a first cleaning member is disposed on a first end of the handle, a second cleaning member is disposed on a second end of the handle, and a third cleaning member is disposed in line with the handle between the first end and the second end.

4. The device of claim 1 wherein the paint-scraping rim is comprised of an annular wall smaller in depth than the paint-guiding wall.

5. The device of claim 1 wherein the device is wholly constructed of substantially rigid material resistant to paint adherence.

6. The device of claim 1 wherein each opening is configured to be threaded over a paint roller frame and each paint-scraping rim is sized to tightly receive a paint roller sleeve.

7. A method for removing excess liquid from a paint roller nap using the device of claim 1 whereby:
- the device is threaded over a paint roller frame through the opening until the paint-scraping rim reaches a first end of a paint roller sleeve, and
- a downward force is applied to the handle,
- the paint-scraping rim interfaces with the paint roller nap on the paint roller sleeve, and
- the paint-guiding wall directs excess paint down the paint roller sleeve until the paint-scraping rim reaches a second end of the paint roller sleeve where the opening will release the device from the paint roller sleeve and excess liquid will fall from the paint roller nap after only one swipe.

8. The device of claim 1 wherein the paint-guiding wall has a diameter that is larger than the opening.

9. The device of claim 1 wherein the paint-guiding wall has a diameter that is larger than the diameter of the inner circumference of the paint-scraping rim.

10. The device of claim 1 wherein the handle of the device is configured to permit the application of variations in leverage for removal of paint from a paint roller nap with one pass.

11. A multi-size paint roller cleaning device comprising:
- a handle,
- three, full-circle cleaning members disposed along a length of the handle,
- each cleaning member having
  - an opening encircled by a roller interface wall,
  - a paint-scraping rim having an inner circumference and an outer circumference,
  - the inner circumference of the paint-scraping rim adjacent to the roller interfacing wall,
  - a paint-guiding wall annularly extending perpendicularly from the outer circumference of the paint-scraping rim,
- wherein a first cleaning member is disposed on a first end of the handle, a second cleaning member is disposed on a second end of the handle, and a third cleaning member is disposed along the handle between the first end and the second end.

12. The device of claim 11 wherein the paint-scraping rim is comprised of an annular wall smaller in depth than the paint-guiding wall.

13. The device of claim 11 wherein the device is wholly constructed of substantially rigid material resistant to paint adherence.

14. The device of claim 11 wherein each opening is configured to receive a paint roller frame and each paint-scraping rim is sized to tightly receive a paint roller sleeve.

15. A method for removing excess liquid from a paint roller nap using the device of claim 14 whereby:
- the device is threaded over the paint roller frame through the opening until the paint-scraping rim reaches a first end of the paint roller sleve, and,
- a downward force is applied to the handle,
- the paint-scraping rim interfaces with the paint roller nap on the paint roller sleeve,
- the paint-guiding wall directs excess paint down the paint roller nap until the paint-scraping rim reaches a second end of the paint roller sleeve where the opening will release the device from the paint roller sleve and excess liquid will fall from the paint roller nap with only one pass.

16. An improved, multi-size paint roller cleaning device comprising:
- a handle,
- more than one cleaning member disposed along a length of the handle,
- each cleaning member having
  - an opening,
  - an interfacing wall with a continuous circumference sized to receive a paint roller at a narrowest point of a paint roller nap,
  - a paint-scraping rim having an inner circumference and an outer circumference,
  - the inner circumference of the paint-scraping rim adjacent to the interfacing wall,
  - a paint-guiding wall annularly extending perpendicularly from the outer circumference of the paint scraping rim to route the excess paint down the paint roller,
- wherein a first cleaning member is disposed on a first end of the handle, a second cleaning member is disposed on a second end of the handle, and a third cleaning member is disposed along the handle between the first end and the second end,
- wherein each opening is configured to receive a paint roller frame and each paint-scraping rim is sized to tightly receive the paint roller.

17. A method for removing excess liquid from the paint roller nap using the device of claim 16 whereby:
- the device is threaded over the paint roller frame through the opening until the paint-scraping rim reaches a first end of the paint roller, and
- a downward force is applied to the handle,
- the paint-scraping rim interfaces with the paint roller nap to scrape paint from the paint roller nap then allowing the paint roller nap to pass between the interfacing wall and the paint roller,
- the paint-guiding wall directs excess paint down the paint roller until the paint-scraping rim reaches a second end of the paint roller where the opening will release the device from the paint roller and excess liquid will fall from the paint roller nap with a single swipe.

18. A method for removing a paint sleeve from a paint roller frame without user contact with the paint roller nap of the paint sleeve using the device of claim 16, the method comprising the steps of:
- moving the paint roller cleaning device over the paint sleeve,
- pulling the device half-way down the paint sleeve,
- placing the device at an angle to connect with the paint sleeve at the interior wall and also a bottom edge of the paint-guiding wall,
- holding pressure at the angle and pulling the device away from the handle such that the paint sleeve is pulled from the paint roller frame.

19. The device of claim 16 wherein the paint-guiding wall has a diameter that is larger than the opening.

20. The device of claim 16 wherein the paint-guiding wall has a diameter that is larger than the diameter of the inner circumference of the paint-scraping rim.

* * * * *